United States Patent
Bell et al.

(10) Patent No.: US 9,028,571 B2
(45) Date of Patent: May 12, 2015

(54) SYNGAS COOLER SYSTEM AND METHOD OF OPERATION

(75) Inventors: Peter S. Bell, Fayetteville, AR (US); Nicolas Vanhecke, Martigues (FR); Bernard Descales, Marseilles (FR)

(73) Assignee: Ineos Bio SA, Rolle (CH)

( * ) Notice: Subject to any disclaimer, the term of this patent is extended or adjusted under 35 U.S.C. 154(b) by 819 days.

(21) Appl. No.: 13/324,299

(22) Filed: Dec. 13, 2011

(65) Prior Publication Data

US 2012/0256128 A1    Oct. 11, 2012

Related U.S. Application Data

(60) Provisional application No. 61/516,667, filed on Apr. 6, 2011, provisional application No. 61/516,704, filed on Apr. 6, 2011, provisional application No. 61/516,646, filed on Apr. 6, 2011.

(51) Int. Cl.
| | | |
|---|---|---|
| C01B 3/24 | (2006.01) | |
| B01J 7/00 | (2006.01) | |
| C10J 3/72 | (2006.01) | |
| C10J 3/84 | (2006.01) | |

(Continued)

(52) U.S. Cl.
CPC ............ *C10J 3/72* (2013.01); *C01B 2203/0877* (2013.01); *C01B 2203/0894* (2013.01); *C10J 3/84* (2013.01); *C10J 3/86* (2013.01); *C10J 2300/1884* (2013.01); *C10K 3/005* (2013.01); *C10K 3/008* (2013.01); *C10J 3/723* (2013.01); *C10J 3/726* (2013.01); *C10J 2300/0956* (2013.01); *C10J 2300/0959* (2013.01); *Y02E 50/17* (2013.01); *Y02E 50/32* (2013.01); *Y02E 50/343* (2013.01); *C10K 1/04* (2013.01); *C10J 3/721* (2013.01); *C10J 2300/1606* (2013.01); *C10J 2300/1846* (2013.01); *F22B 1/1838* (2013.01); *Y02T 10/16* (2013.01); *C10K 1/02* (2013.01); *C10K 3/003* (2013.01)

(58) Field of Classification Search
USPC ........... 48/61, 127.9, 127.1, 197 R, 76, 198.3
See application file for complete search history.

(56) References Cited

U.S. PATENT DOCUMENTS

| 3,980,592 A | 9/1976 | Marion |
|---|---|---|
| 4,017,271 A | 4/1977 | Barclay et al. |

(Continued)

FOREIGN PATENT DOCUMENTS

| WO | 9318341 | 9/1993 |
|---|---|---|
| WO | WO2007/048058 A2 | 4/2007 |

(Continued)

OTHER PUBLICATIONS

International Search Report—PCT/US2012/032160, dated Aug. 30, 2012 (4 pgs.).

(Continued)

*Primary Examiner* — Kaity Handal
(74) *Attorney, Agent, or Firm* — Ineos USA LLC

(57) ABSTRACT

A process and system for cooling syngas provides effective syngas cooling and results in reduced levels of fouling in syngas cooling equipment. A process for cooling syngas includes blending syngas with cooled recycled syngas in an amount effective for providing a blended syngas with a temperature at an inlet of a syngas cooler of about 600° F. to about 1400° F. The blended syngas changes direction of flow at least once prior to the inlet of the syngas cooler.

25 Claims, 2 Drawing Sheets

(51) Int. Cl.

| | | |
|---|---|---|
| *C10J 3/86* | (2006.01) | |
| *C10K 3/00* | (2006.01) | |
| *C10K 1/04* | (2006.01) | |
| *F22B 1/18* | (2006.01) | |
| *C10K 1/02* | (2006.01) | |

(56) References Cited

U.S. PATENT DOCUMENTS

| | | | |
|---|---|---|---|
| 4,805,562 A * | 2/1989 | Davis et al. ............ | 122/7 R |
| 4,823,742 A * | 4/1989 | Davis et al. ............ | 122/7 R |
| 4,959,080 A * | 9/1990 | Sternling ............... | 48/210 |
| 5,145,491 A | 9/1992 | Schmitt et al. | |
| 6,033,447 A | 3/2000 | Moock et al. | |
| 7,090,707 B1 * | 8/2006 | Barot ..................... | 48/113 |
| 7,285,402 B2 | 10/2007 | Gaddy | |
| 7,587,995 B2 | 9/2009 | Kraft | |
| 7,923,476 B2 | 4/2011 | Young | |
| 7,932,298 B2 | 4/2011 | Young | |
| 2007/0266634 A1 | 11/2007 | Tsangaris | |
| 2008/0115415 A1 | 5/2008 | Agrawal et al. | |
| 2008/0169449 A1 | 7/2008 | Mundschau | |
| 2008/0209807 A1 | 9/2008 | Tsangaris | |
| 2008/0210089 A1 | 9/2008 | Tsangaris | |
| 2008/0244976 A1 | 10/2008 | Paisley | |
| 2009/0018222 A1 | 1/2009 | Klepper | |
| 2009/0064581 A1 | 3/2009 | Nielsen et al. | |
| 2009/0090053 A1 | 4/2009 | Feldmann | |
| 2009/0156695 A1 | 6/2009 | Young | |
| 2009/0260286 A1 | 10/2009 | Sasauchi et al. | |
| 2010/0044643 A1 | 2/2010 | Wallace | |
| 2010/0180503 A1 | 7/2010 | Yokohama et al. | |
| 2010/0224835 A1 | 9/2010 | Chornet et al. | |
| 2010/0256246 A1 | 10/2010 | Carryer | |
| 2010/0317077 A1 | 12/2010 | Gaddy et al. | |
| 2011/0076227 A1 | 3/2011 | Suda | |
| 2011/0248218 A1 | 10/2011 | Sutradhar | |
| 2011/0250661 A1 | 10/2011 | Sutradhar | |
| 2011/0250662 A1 | 10/2011 | Sutradhar | |

FOREIGN PATENT DOCUMENTS

| | | |
|---|---|---|
| WO | 2007112101 | 10/2007 |
| WO | 2007117157 | 10/2007 |
| WO | 2007131241 | 11/2007 |
| WO | 2008098311 | 8/2008 |
| WO | WO2009/023364 A2 | 2/2009 |
| WO | WO2009/106357 A2 | 9/2009 |
| WO | 2009154788 | 12/2009 |
| WO | WO2009/155697 A1 | 12/2009 |

OTHER PUBLICATIONS

International Search Report—PCT/US2012/032174, dated Aug. 20, 2012 (3 pgs.).

Intternational Search Report—PCT/US2010032168, dated Apr. 16, 2012, 3 (pgs).

Houben et al., Tar Reduction Through Partial Combustion of Fuel Gas, Fuel 84(2005): 817-824.

Van Der Hoeven et al., Analysis of Hydrogen Influence on Tar Removal by Partial Oxidation, Fuel 85(2006): 1101-1110.

U.S. Appl. No. 13/427,144, filed Mar. 22, 2012.

U.S. Appl. No. 13/427,193, filed Mar. 22, 2012.

U.S. Appl. No. 13/427,247, filed Mar. 22, 2012.

U.S. Appl. No. 13/324,321, filed Dec. 13, 2011.

* cited by examiner

SYNGAS COOLER SYSTEM AND METHOD OF OPERATION

This application claims the benefit of U.S. Provisional Application Nos. 61/516,667, 61/516,704 and 61/516,646, all of which were filed on Apr. 6, 2011, and all of which are incorporated in their entirety herein by reference.

A process and system is provided for cooling syngas. More specifically, syngas is blended with cooled recycled syngas to provide a blended syngas. The blended syngas is subsequently transferred to a syngas cooler.

BACKGROUND

Microorganisms can produce ethanol and other compounds from carbon monoxide (CO) through fermentation of gaseous substrates. The CO is often provided to the fermentation as part of a gaseous substrate in the form of a syngas. Gasification of carbonaceous materials to produce producer gas or synthesis gas or syngas that includes carbon monoxide and hydrogen is well known in the art. Typically, such a gasification process involves a partial oxidation or starved-air oxidation of carbonaceous material in which a sub-stoichiometric amount of oxygen is supplied to the gasification process to promote production of carbon monoxide.

Syngas produced by gasification processes described in the art can be hot and needs cooling prior to downstream processing and subsequent fermentation. Hot syngas comprising carbon monoxide generated in a gasification apparatus, is cooled in a heat exchanger or waste heat boiler downstream of the gasification apparatus, see for example U.S. Pat. Nos. 6,435,139; 7,587,995 and 7,552,701. Effective and controlled cooling of syngas is important in minimizing fouling.

SUMMARY

A process and system for cooling syngas provides effective syngas cooling and results in reduced levels of fouling in syngas cooling equipment. In one aspect, a process for cooling syngas includes blending syngas with cooled recycled syngas in an amount effective for providing a blended syngas with a temperature at an inlet of a syngas cooler of about 600° F. to about 1400° F. The blended syngas changes direction of flow at least once prior to the inlet of the syngas cooler.

In another aspect, a syngas mixing system includes a gasification chamber having a diameter $D_H$ and a syngas recycle inlet having a diameter $D_C$. The syngas recycle inlet enters the gasification chamber at a distal end of the gasification chamber. The system includes a gasification outlet having a diameter $D_M$. The gasification outlet is continuous with the distal end of the gasification chamber and the gasification outlet including at least one change of direction prior to entering a syngas cooler.

In another aspect, a process for cooling syngas includes blending syngas with cooled recycled syngas in an amount effective for providing a blended syngas with a temperature at an inlet of a syngas cooler in the range of about 600° F. to about 1400° F. The cooled recycled syngas is supplied to a distal end of a gasification chamber having a diameter $D_H$ through a syngas recycle inlet having a diameter $D_C$, and $D_C/D_H$ is about 0.25 to about 0.75.

BRIEF DESCRIPTION OF FIGURES

The above and other aspects, features and advantages of several aspects of the process will be more apparent from the following drawings.

Figure 1:
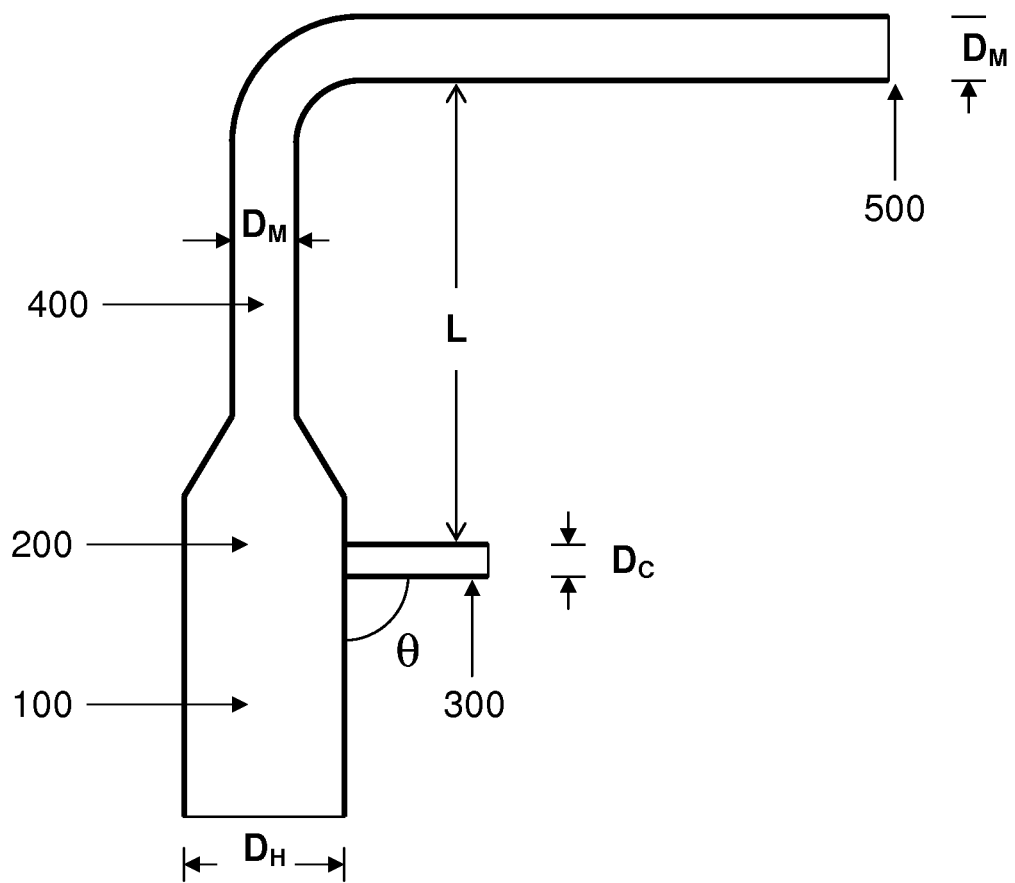
FIG. 1 illustrates a syngas mixing system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects of the present process and apparatus. Also, common but well-understood elements that are useful or necessary in commercially feasible aspects are often not depicted in order to facilitate a less obstructed view of these various aspects.

DETAILED DESCRIPTION

The following description is not to be taken in a limiting sense, but is made merely for the purpose of describing the general principles of exemplary embodiments. The scope of the invention should be determined with reference to the claims.

The syngas cooling process and system are operated at temperatures effective for providing effective syngas cooling and reduced fouling of equipment. Design of the system provides effective syngas mixing.

Definitions

Unless otherwise defined, the following terms as used throughout this specification for the present disclosure are defined as follows and can include either the singular or plural forms of definitions below defined:

The term "about" modifying any amount refers to the variation in that amount encountered in real world conditions, e.g., in the lab, pilot plant, or production facility. For example, an amount of an ingredient or measurement employed in a mixture or quantity when modified by "about" includes the variation and degree of care typically employed in measuring in an experimental condition in production plant or lab. For example, the amount of a component of a product when modified by "about" includes the variation between batches in a multiple experiments in the plant or lab and the variation inherent in the analytical method. Whether or not modified by "about," the amounts include equivalents to those amounts. Any quantity stated herein and modified by "about" can also be employed in the present disclosure as the amount not modified by "about".

"Carbonaceous material" as used herein refers to carbon rich material such as coal, and petrochemicals. However, in this specification, carbonaceous material includes any carbon material whether in solid, liquid, gas, or plasma state. Among the numerous items that can be considered carbonaceous material, the present disclosure contemplates: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

The term "fibersoft" or "Fibersoft" or "fibrosoft" or "fibrousoft" means a type of carbonaceous material that is produced as a result of softening and concentration of various substances; in an example carbonaceous material is produced via steam autoclaving of various substances. In another example, the fibersoft can include steam autoclaving of municipal, industrial, commercial, and medical waste resulting in a fibrous mushy material.

The term "municipal solid waste" or "MSW" or "msw" means waste that may include household, commercial, industrial and/or residual waste.

The term "syngas" or "synthesis gas" means synthesis gas which is the name given to a gas mixture that contains varying amounts of carbon monoxide and hydrogen. Examples of production methods include steam reforming of natural gas or hydrocarbons to produce hydrogen, the gasification of coal and in some types of waste-to-energy gasification facilities. The name comes from their use as intermediates in creating synthetic natural gas (SNG) and for producing ammonia or methanol. Syngas is combustible and is often used as a fuel source or as an intermediate for the production of other chemicals.

In one aspect, gasification of carbonaceous materials provides syngas. Gasification involves partial combustion of biomass in a restricted supply of oxygen. The resultant gas includes CO and $H_2$. In this aspect, syngas will contain at least about 20 mole % CO, in one aspect, about 20 to about 100 mole % CO, in another aspect, about 30 to about 90 mole % CO, in another aspect, about 40 to about 80 mole % CO, and in another aspect, about 50 to about 70 mole % CO. The syngas will have a $CO/CO_2$ ratio of at least about 0.75. Ser. Nos. 61/516,667, 61/516,704 and 61/516,646 describe some examples of suitable gasification methods and apparatus (U.S. Ser. Nos. 61/516,667, 61/516,704 and 61/516,646, all of which were filed on Apr. 6, 2011, and all of which are incorporated herein by reference). Syngas leaving the gasifier will have a temperature above about 1400° F., and in another aspect, at least about 1400° F. to about 3500° F. The gasification process is effective for destruction of tars.

Syngas Cooling System

As shown in FIG. 1, the gas mixing system includes a gasification chamber 100. A syngas recycle inlet 300 enters a distal end or exit section of the gasification chamber 200. In this aspect, the syngas recycle inlet 300 enters the distal end 200 of the gasification chamber 100 at an outer circumference. The gasification inlet 300 enters the distal end of the gasification chamber 200 tangentially and may be at an angle (shown as θ) of about 15 to about 165°, in another aspect, about 30 to about 150°, in another aspect, about 45 to about 135°, in another aspect, about 60 to about 120°, in another aspect, about 75 to about 105°, and in another aspect, about 85 to about 95°.

Hot syngas leaving the gasifier 100 contacts recycled cooled syngas through a syngas recycle inlet 300. The recycled cooled syngas contacts the hot syngas at a point after the hot syngas leaves the gasifier and before the blended syngas enters a syngas cooler (not shown) through a gasification outlet 400. The gasification outlet 400 may be a conduit or pipe. In this aspect, "recycled cooled syngas" refers to a syngas that has been cooled in a syngas cooler to a temperature of about 350° F. to about 450° F.

The process includes blending recycled cooled syngas with hot syngas at a ratio of about 0.1 to about 20. In other aspects, ratios of recycled cooled syngas to hot syngas may include about 1 to about 15, about 1 to about 10, about 1 to about 5, about 1 to about 4, about 1 to about 3, about 1 to about 2, and about 1 to about 1.

The blended syngas has a temperature of about 1400° F. or less, in another aspect, about 600° F. to about 1400° F., in another aspect, about 750° F. to about 1400° F., in another aspect, about 600° F. to about 1400° F., in another aspect, about 750° F. to about 1200° F., in another aspect, about 750° F. to about 900° F., in another aspect, about 750° F. to about 825° F., and in another aspect, about 600° F. to about 900° F. In this aspect, a thermocouple measures temperature at an inlet of the syngas cooler 500. The thermocouple may be positioned at any position across a diameter of the inlet of the syngas cooler 500.

As used herein, "average temperature" can be determined using known methods utilized to determine multiple temperatures across a diameter and then express those multiple temperature measurements as an average. In one aspect, computer modeling (including CFD) may be used to provide an average temperature. In other aspects, multiple temperature measurements may be made using temperature sensors such as thermocouples, infrared, radar, and the like.

Temperature, flow rates and configuration of the syngas cooler are effective for preventing flow of recycled cooled syngas and blended syngas into the gasification chamber 200. In this aspect, flow through the syngas cooler is greater than about 24 meters per second.

As further shown in FIG. 1, the distal end of the gasification chamber 200 is continuous with a gasification outlet 400. The gasification outlet 400 may change direction at least once before entering a syngas cooler. As shown in FIG. 1, the gasification outlet 400 changes direction once at a 90° angle. In this aspect, the gasification outlet 400 may change direction at least once, with any change of direction each independently being at an angle of about 15 to about 165°.

As illustrated in FIG. 1, the gasification chamber 200 has a diameter of $D_H$, the syngas recycle inlet 300 has a diameter of $D_C$, and the gasification outlet 400 has a diameter of $D_M$. The syngas recycle inlet 300 is located a distance (L) away from the gasification outlet 400. Ratios of measurements may be as follows:

$D_C/D_H$: about 0.25 to about 0.75, in another aspect, about 0.35 to about 0.65, and in another aspect, about 0.45 to about 0.55;

$L/D_H$: about 1 to about 10, in another aspect, about 3 to about 8, and in another aspect, about 4 to about 6; and $D_H/D_M$: about 0.5 to about 2.0, in another aspect, about 0.75 to about 1.75, and in another aspect, about 1.0 to about 1.5.

In another aspect, the syngas recycle inlet 300 may have a diameter of about 32 to about 42 inches, in another aspect, about 34 to about 40 inches, and in another aspect, about 35 to about 38 inches. The gasification outlet 400 may have a diameter of about 40 to about 52 inches, in another aspect, about 43 to about 49 inches, and in another aspect, about 45 to about 47 inches.

Figure 2:
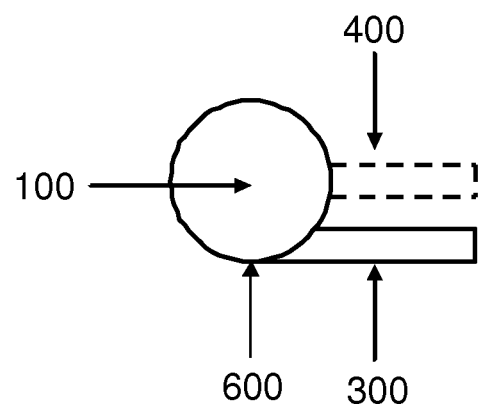
FIG. 2 shows a bottom view of a syngas mixing system.

FIG. 2 illustrates a bottom view of the syngas cooling system. In this aspect, the syngas recycle inlet 300 enters the gasification chamber 100 at an outer circumference 600 of the gasification chamber.

In another aspect, the syngas recycle inlet 300 enters the gasification chamber 100 at a point above the gasification chamber 100 and initial gas mixing occurs at a point above the gasification chamber 100. In this configuration, any deposits formed may fall back down into the gasification chamber 100.

EXAMPLES

Example 1

Effect of Syngas Cooler Inlet Temperature on Heat Transfer and Fouling

A gasifier having the design described herein was operated with the temperatures and flow rates described below. A fouling factor was determined as indicated.

Fouling factor at 600° F. inlet temperature to the syngas cooler:

| Accumulated Time (hrs) | Temperature of Syngas at Inlet of Syngas Cooler (° F.) | Syngas Feed Rate to Cooler (lb/hr) | Fouling Factor Btu/ (ft$^2$h ° F.) |
| --- | --- | --- | --- |
| 7.7 | 601 | 477 | 0.022 |
| 15.7 | 614 | 512 | 0.034 |
| 23.7 | 597 | 862 | 0.009 |
| 31.7 | 608 | 730 | 0.008 |
| 40 | 605 | 1647 | 0.002 |
| 56 | 597 | 432 | 0.023 |
| 64.7 | 593 | 705 | 0.011 |
| 72 | 577 | 618 | 0.014 |
| 80 | 595 | 596 | 0.019 |
| 89 | 577 | 1416 | 0.007 |
| 188.15 | 583 | 355 | 0.006 |
| 196 | 572 | 372 | 0.024 |
| 207.7 | 565 | 345 | 0.048 |
| 216 | 577 | 317 | 0.034 |
| 223.7 | 572 | 385 | 0.024 |

Average fouling factor at 600° F. inlet was 0.019 Btu/(ft$^2$h° F.).

A gasifier having the design described herein was operated with lower syngas cooler inlet temperatures and flow rates described below. A fouling factor was determined as indicated.

Fouling factor at 1300° F. inlet temperature to the syngas cooler:

| Accumulated Time (hrs) | Temperature of Syngas at Inlet of Syngas Cooler (° F.) | Syngas Feed Rate to Cooler (lb/hr) | Fouling Factor Btu/ (ft$^2$h ° F.) |
| --- | --- | --- | --- |
| 7.5 | 1297 | 288 | 0.042 |
| 19.5 | 1293 | 314 | 0.070 |
| 105.5 | 1295 | 215 | 0.119 |
| 118.5 | 1295 | 230 | 0.100 |
| 129.5 | 1294 | 194 | 0.123 |
| 153.5 | 1297 | 191 | 0.098 |
| 166.5 | 1295 | 198 | 0.096 |
| 177.5 | 1295 | 233 | 0.072 |
| 190.5 | 1297 | 209 | 0.099 |
| 260.5 | 1308 | 240 | 0.050 |
| 273.5 | 1302 | 214 | 0.067 |
| 285.5 | 1301 | 183 | 0.082 |
| 298.5 | 1295 | 229 | 0.078 |
| 309.5 | 1296 | 264 | 0.080 |
| 317 | 1314 | 240 | 0.097 |
| 326.5 | 1328 | 275 | 0.078 |
| 338.83 | 1322 | 291 | 0.068 |
| 346.5 | 1332 | 281 | 0.070 |
| 350.5 | 1346 | 312 | 0.071 |
| 368.5 | 1336 | 213 | 0.081 |
| 374.5 | 1335 | 263 | 0.074 |

Average fouling factor at 1300° F. inlet was 0.078 Btu/(ft$^2$h° F.).

While the invention herein disclosed has been described by means of specific embodiments, examples and applications thereof, numerous modifications and variations could be made thereto by those skilled in the art without departing from the scope of the invention set forth in the claims.

What is claimed is:

1. A process for cooling syngas, the process comprising: blending syngas with cooled recycled syngas in an amount effective for providing a blended syngas with a temperature at an inlet of a syngas cooler of about 600° F. to about 1400° F.,
wherein the blended syngas changes direction of flow at least once prior to the inlet of the syngas cooler; wherein the cooled recycled syngas is supplied to a distal end of a gasification chamber having a diameter DH through a syngas recycle inlet having a diameter Dc; and wherein the blended syngas is supplied to a gasification outlet having a diameter DM, the gasification outlet is continuous with the distal end of the gasification chamber.

2. The process of claim 1 wherein the cooled recycled syngas has a temperature of about 350° F. to about 450° F.

3. The process of claim 1 wherein cooled recycled syngas is blended with syngas at a ratio of about 0.1 to about 20.

4. The process of claim 1 wherein the blended syngas has a temperature of about 600° F. to about 900° F.

5. The process of claim 4 wherein the blended syngas has a temperature of about 750° F. to about 825° F.

6. The process of claim 1 wherein the syngas recycle inlet enters the distal end of the gasification chamber tangentially at an outer circumference of the gasification chamber.

7. The process of claim 1 wherein the syngas recycle inlet enters the distal end of the gasification chamber at an angle of about 15 to about 165°.

8. The process of claim 1 wherein L(distance syngas recycle inlet is away from gasifier outlet)/$D_H$ is about 1 to about 10.

9. The process of claim 1 wherein $D_C/D_H$ is about 0.25 to about 0.75.

10. The process of claim 1 wherein $D_H/D_M$ is about 0.5 to about 2.0.

11. A syngas mixing system comprising:
a gasification chamber having a diameter $D_H$;
a syngas recycle inlet having a diameter $D_C$, the syngas recycle inlet entering the gasification chamber at a distal end of the gasification chamber; and
a gasification outlet having a diameter $D_M$, the gasification outlet continuous with the distal end of the gasification chamber, the gasification outlet including at least one change of direction prior to entering a syngas cooler; and wherein the blended syngas is supplied to the gasification outlet.

12. The gas mixing system of claim 11 wherein the syngas recycle inlet enters the distal end of the gasification chamber tangentially at an outer circumference of the gasification chamber.

13. The gas mixing system of claim 11 wherein the syngas recycle inlet enter the distal end of the gasification chamber at an angle of about 15 to about 165°.

14. The gas mixing system of claim 11 wherein L(distance syngas recycle inlet is away from gasifier outlet)/$D_H$ is about 1 to about 10.

15. The gas mixing system of claim 11 wherein $D_C/D_H$ is about 0.25 to about 0.75.

16. The gas mixing system of claim 11 wherein $D_H/D_M$ is about 0.5 to about 2.0.

17. A process for cooling syngas, the process comprising:
blending syngas with cooled recycled syngas in an amount effective for providing a blended syngas with a temperature at an inlet of a syngas cooler of about 600° F. to about 1400° F.,
wherein cooled recycled syngas is supplied to a distal end of a gasification chamber having a diameter $D_H$ through a syngas recycle inlet having a diameter $D_C$, and $D_C/D_H$ is about 0.25 to about 0.75; wherein the blended syngas changes direction of flow at least once prior to the inlet of the syngas cooler; and wherein blended syngas is supplied to a gasification outlet having a diameter DM, the gasification outlet is continuous with the distal end of the gasification chamber.

18. The process of claim 17 wherein the cooled recycled syngas has a temperature of about 350° F. to about 450° F.

19. The process of claim 17 wherein cooled recycled syngas is blended with syngas at a ratio of about 0.1 to about 20.

20. The process of claim 17 wherein the blended syngas has a temperature of about 600° F. to about 900° F.

21. The process of claim 20 wherein the blended syngas has a temperature of about 750° F. to about 825° F.

22. The process of claim 17 wherein $D_H/D_M$ is about 0.5 to about 2.0.

23. The process of claim 17 wherein the syngas recycle inlet enters the distal end of the gasification chamber tangentially at an outer circumference of the gasification chamber.

24. The process of claim 17 wherein the syngas recycle inlet enters the distal end of the gasification chamber at an angle of about 15 to about 165°.

25. The process of claim 17 wherein L(distance syngas recycle inlet is away from gasifier outlet)/$D_H$ is about 1 to about 10.

* * * * *